Aug. 20, 1946.     O. E. SORENSEN     2,406,043
FIXTURE FOR HOLDING AND MEASURING WORK AT SELECTIVE ANGLES
Filed Oct. 31, 1942     3 Sheets-Sheet 1
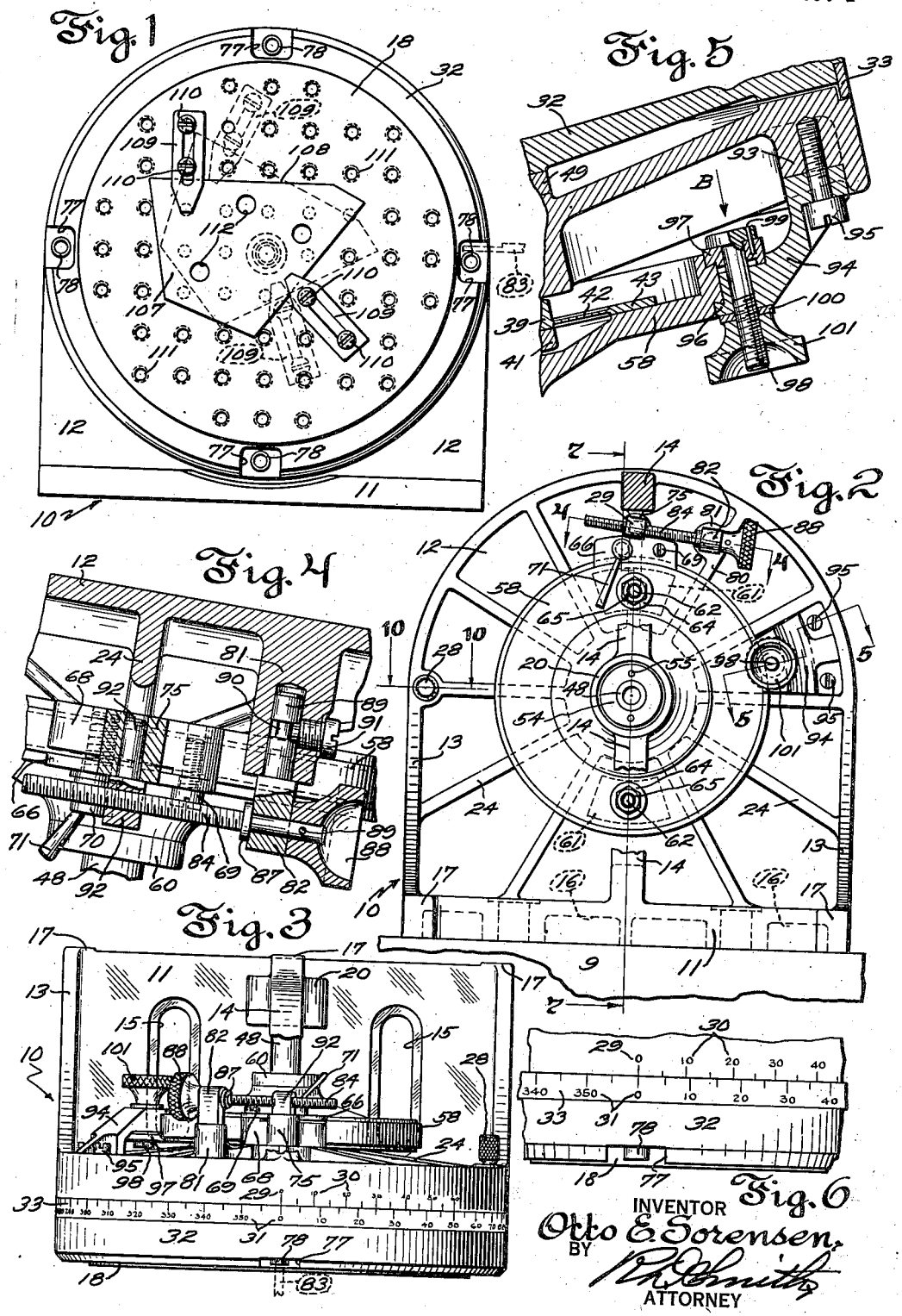
INVENTOR
Otto E. Sorensen,
BY
ATTORNEY Aug. 20, 1946.  O. E. SORENSEN  2,406,043
FIXTURE FOR HOLDING AND MEASURING WORK AT SELECTIVE ANGLES
Filed Oct. 31, 1942.  3 Sheets-Sheet 2
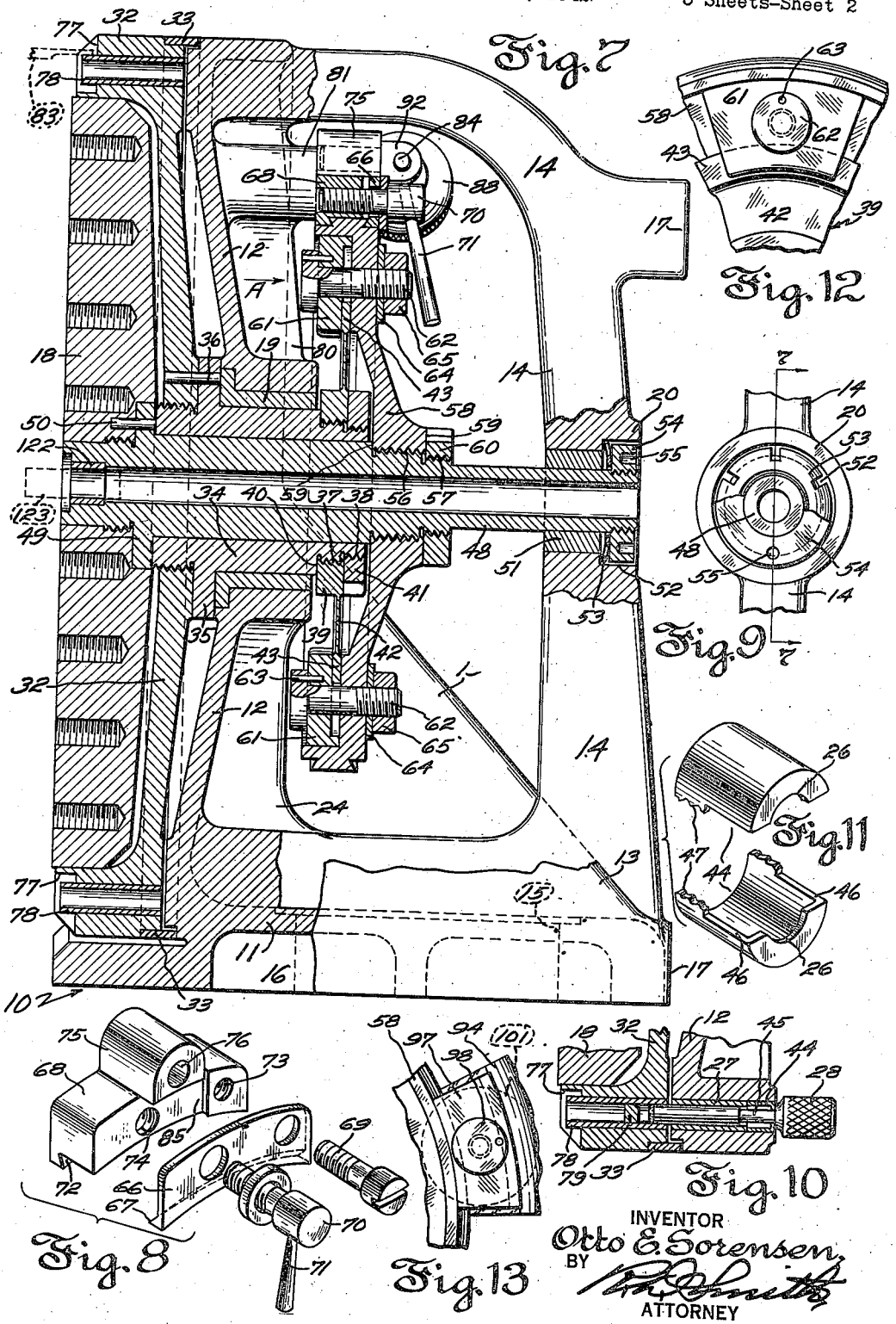
INVENTOR
Otto E. Sorensen,
BY 
ATTORNEY

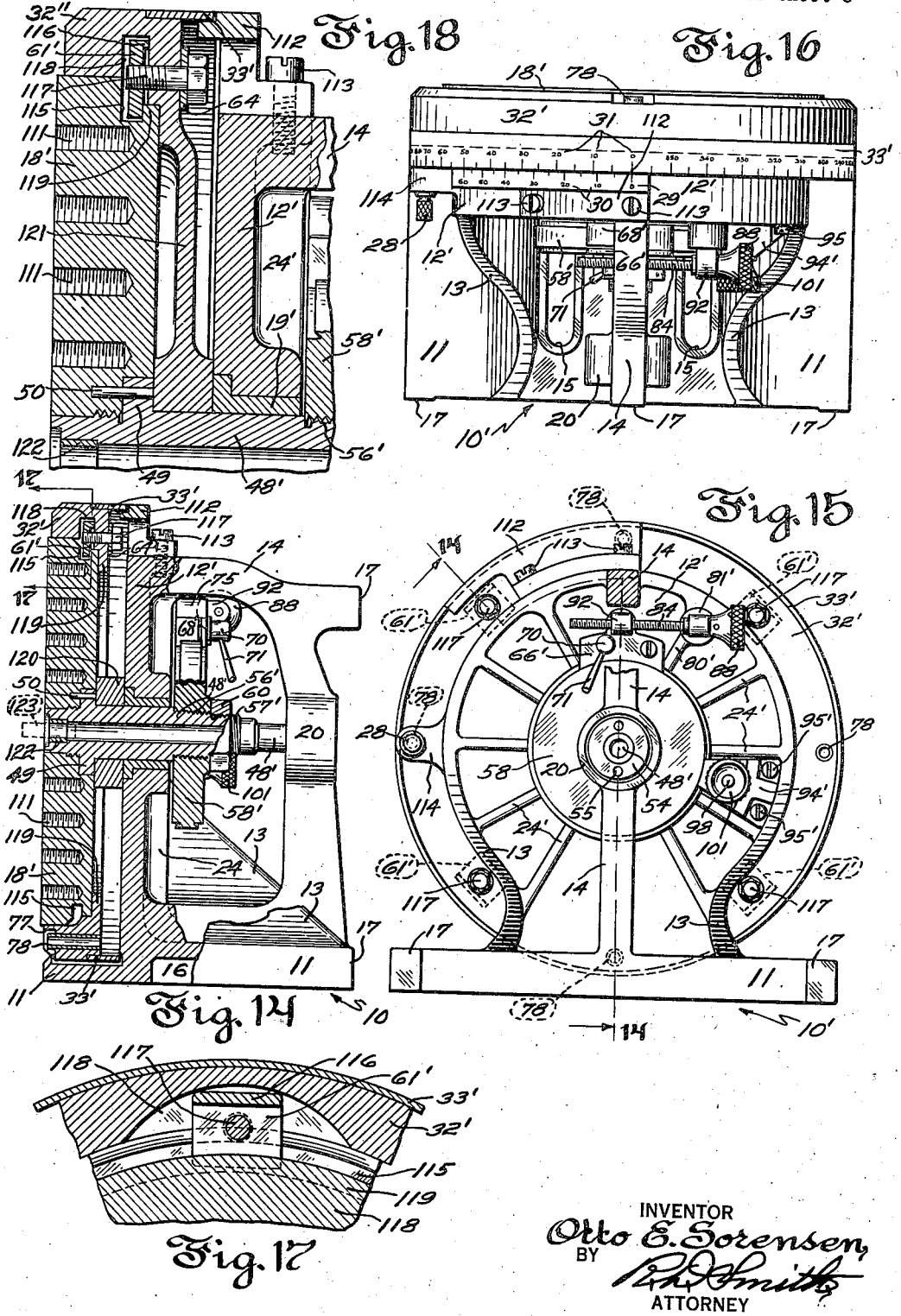

Patented Aug. 20, 1946

2,406,043

UNITED STATES PATENT OFFICE 2,406,043

FIXTURE FOR HOLDING AND MEASURING WORK AT SELECTIVE ANGLES

Otto E. Sorensen, Fairfield, Conn.

Application October 31, 1942, Serial No. 464,052

22 Claims. (Cl. 33—174)

This invention relates to an improved organization of movable parts in a fixture of unitary nature for measuring, testing or laying out a work piece, and particularly relates to a fixture of this type adapted to hold and swing the work to different angles relative to the true horizontal which angles may then accurately be determined by the familiar sine-bar principles of measurement and computation.

The herein disclosed construction of such a fixture may be compared with a related form of fixture described and claimed in my copending application, Serial No. 294,489, filed September 12, 1939, on which U. S. Patent No. 2,345,312 was granted March 28, 1944. In the fixture of said copending application, as well as herein, there is provided a composite rotatable work support and means to stay the component parts thereof against relative or absolute rotary movement. The composite work support still includes a work holding plate but according to the present improvements it is aimed to stay the rotatable plate, on which the work piece is directly secured, against absolute rotary movement (movement in relation to frame) without dependence for this function upon the fixation of an associated angle measuring wheel.

Also in the present improvements it is an object to afford micrometer adjustment of the rotary position of the work holding plate with respect to the frame without dependence for this function upon the aforementioned measuring wheel.

Other objects are to provide a maximum effective overall length for the bearing support given to the work holding plate and to improve the readiness of manipulation and the holding power of various clamping devices employed to arrest certain rotatable parts.

With these and other objects in view which are made clear hereinafter there is shown in the appended drawings an illustrative embodiment of the present improvements which are described in greater detail hereinafter.

In the drawings:

Fig. 1 is a front view of a measuring and layout fixture embodying the present improvements showing a sample of work piece clamped thereon.

Fig. 2 is a rear view of the same layout fixture.

Fig. 3 is a plan view of the same layout fixture.

Fig. 4 is an enlarged fragmentary view taken in section on the plane 4—4 in Fig. 2 looking in the direction of the arrows.

Fig. 5 is an enlarged fragmentary view on the planes 5—5 in Fig. 2 looking in the direction of the arrows.

Fig. 6 is an enlarged view of a forward central portion of Fig. 3.

Fig. 7 is an enlarged view partly in side elevation looking from the left at Fig. 2 showing most of the fixture in central vertical section on the planes 8—8 in Fig. 2.

Fig. 8 is an enlarged exploded perspective view of the staying clamp of the micrometer adjustment.

Fig. 9 is an enlarged view of the central portion of Fig. 2 drawn on the same scale as Fig. 7 showing certain structure partially broken away.

Fig. 10 is an enlarged fragmentary view taken in section on the plane 10—10 in Fig. 2 showing improved construction in locking plug details.

Fig. 11 is a greatly enlarged perspective view of a split cup for retaining the lock plug.

Fig. 12 shows one of the clamps and fragments of associate members on which it acts viewed as indicated by arrow A in Fig. 7.

Fig. 13 shows another clamp and associated structure viewed as indicated by arrow B in Fig. 5.

Fig. 14 is a view showing a modification of the construction in Fig. 7 drawn on a scale similar to Fig. 1 and showing most of the parts in section on the divergent planes 14—14 in Fig. 15.

Fig. 15 is a rear view comparable with Fig. 2, looking from the right at the modified form of measuring fixture shown in Fig. 14.

Fig. 16 is a plan view of the modified fixture shown in Figs. 14 and 15.

Fig. 17 is an enlarged fragmentary view taken in section on the plane 17—17 in Fig. 14 looking in the direction of the arrows.

Fig. 18 is an enlarged fragmentary view of a portion of the structure shown in Fig. 14 incorporating still further modification.

Referring to the drawings, the angle base or support base of the illustrated sine bar fixture is designated as a whole by 10 and consists of a base wall 11, an upright centrally apertured support wall 12, bracing side walls 13, and a centrally located rigid bail-shaped handle 14 bridging the angle embraced by base wall 11 and upright wall 12. Base wall 11 contains elongated slots 15 which may in some uses of the fixture accommodate fastening bolts (not shown) that can extend upward through slots 15 from some customary anchorage, such as conventional T-shaped grooves in a machine tool bed or carriage. But when used for laying out work at the bench, such slots will not be needed because the bottom of base wall 11 is nicely finished to form a smooth planar surface interrupted only by cored channels such as 16 for lightening the fixture without detracting from its strength. Fig. 7 shows the complete stability with which the entire fixture will be supported by its base wall 11 whether or not bolted down. Thus the fixture is adapted to rest stably upon any conventional shop surface plate 9 (see Fig. 2), preferably of greater area than the base wall 11, so that measuring devices such as gage blocks or a height gage whose sensing finger 83 is indicated by broken lines in Figs. 1 and 7, may stand beside the fixture upon the same surface plate and cooperate with sine buttons hereinafter referred to for accurately measuring distances upward from said surface plate. Three bosses 17 are provided, one on the handle 14 and two others on the rear edge of base wall 11, so that together the coplanar, nicely finished, outward directed faces of these bosses provide stable three-point support for the measuring fixture as a whole when it rests on the surface plate with its work holding plate 18 facing upward in horizontal position instead of facing laterally in vertical position.

Upright wall 12 is of dished formation strengthened by ribs 24 which radiate from a hub-like central wall section bored through to receive bearing means in the form of a fixed cylindrical bearing bushing 19. Also at a border point in wall 12 there is embedded the tubular bushing 27 which serves as a slide bearing or orientation hole for a lock plug 28 best shown in Figs. 2 and 10. Further details of this lock plug and its bearing construction are described hereinafter.

The peripheral surface of a measuring wheel 32 is formed with a rabbet onto which is heat-shrunk a metal hoop 33 one edge of which projects rearward from wheel 32 into registering association with an index or "zero" indicium 29 or with associated vernier indicia 30 all marked on the top edge of the front wall 12 of angle base 10. Angle measuring indicia 31 may be marked around the full circle of hoop 33 which may be of steel adapted to stand the stamping of indicia marks therein better than does more brittle cast iron of which wheel 32 might be made.

The angle measuring wheel 32 is secured to a hub or hollow cylindrical trunnion 34 through threaded engagement with the left end of the latter as shown in Fig. 7. In assembling these parts the wheel is first screwed up tightly against the flange 35 of its hub and is then locked against backing off by pins such as 36. This measuring wheel and hub are thus fixed together to comprise a unitary wheel structure journaled in the main bearing bushing 19. Toward its right end in Fig. 7 hub 34 is given a reduced diameter 37 carrying right-handed threads and also a further reduced diameter 38 carrying left-handed threads at its extreme end.

A clutch plate 39 containing a right-handed threaded central bore screws onto the threaded diameter 37 of hub 34 and tightly against the shoulder 40. A left-handed threaded lock nut 41 screws onto the threaded terminal 38 of hub 34 and tightly against the clutch plate 39. Thereby the clutch plate is locked dependably against displacement because no force can turn it any more tightly against hub shoulder 40, while any force tending to turn clutch plate 39 in a direction to back it away from shoulder 40 or toward the right in Fig. 7, will encounter the resistance of nut 41. If this results in any urge upon nut 41 to turn in the same direction, such turning will merely tend to draw nut 41 toward the left in Fig. 7 because of the different hand of the threads on the nut in relation to the threads on the plate, and will thus defeat all tendency of clutch plate 39 to work loose on hub 34. Clutch plate 39 further includes a relatively thin, springy, diaphragm-like web 42 carrying a circularly complete peripheral rim 43 whose front and back faces afford frictional surfaces and are adapted at times to be forced tightly toward a clutch drum 58 for holding the angle measuring wheel 32 rotatably fixed with the work support plate 18.

As in the case of the member termed "carrier ring" in the disclosure of my before mentioned copending application, the present form of measuring wheel 32 has four niches 77 sunk in its front face and which open radially outward through the chamfered peripheral edge of the wheel. Within each of these niches there projects forward from the floor of the niche, but preferably not beyond the frontmost face of measuring wheel 32, the end of a hollow sine plug 78 variously termed in this art, a sine button, sine pin or sine stud. For that part of its function which consists in being contacted by a measuring instrument to determine angles, it is not necessary that a portion of the length of the sine stud be embedded in the structure of the measuring wheel. The sensing finger 83 of a conventional height gauge assumed to stand on, say, the surface plate 9, is admitted into tangential contact with sine plug 78 within niche 77 in the manner shown in Figs. 1 or 7. In the construction shown, however, each plug 78 comprises a bushing fixedly lodged in a hole extending clear through the marginal portion of the measuring wheel and as shown in Figs. 7 and 10, the hollow at the rear end of each plug opens into accurate register with end of the hereinbefore mentioned slide bearing bushing 27 containing lock plug 28. The hole through each sine plug is continuous and truly round and is truly concentric with the outside cylindrical surface of the plug. The sine plugs may be spaced 90 degrees apart with respect to the center of rotation of the measuring wheel, and the center of one of them exactly lines up radially with the "zero" mark 31 of the angle denoting indicia which are marked on scale ring 33. To keep dirt and foreign substances out of that part of the hollow interior of the sine plug to which is admitted the lock plug 28, a stopper disc 79 is fixedly lodged within the sine plug and serves to partition its interior as shown in Fig. 10.

A useful feature of construction for preventing removal and loss of the lock plug 28 consists in the split plug-retaining shell 44 which, as shown in Fig. 10, has separable mating halves fitting together about a reduced diameter portion 45 of the lock pin 28. Shell 44 is inserted together with the plug into the rear end of the bore in wall 12 in endwise relation to slide bushing 27. Shell 44 may be saw-cut diametrically as at 46 along a portion of its length and merely broken apart at 47 for the remainder of its length so that if made large enough in outside diameter to afford a press fit within the bushed hole in wall 12, the act of pressing shell 44 into such hole will not bring to bear any binding pressure of the two halves of the split shell against the reduced diameter portion 45 of the lock plug. The latter is thereby assured a free sliding fit in the bearing hole 26 through the outer end of the split bushing which precludes any entrance of dirt or foreign matter. When assembled, the exposed end of the shell limits the extent to which lock plug 28 can be withdrawn toward the right in Fig. 12 but permits the plug to withdraw from the measuring wheel 44 sufficiently to free the latter to swing rotatably. Locking plug has a very snug but free sliding fit within both sine plug 78 and bushing 27.

The work holding plate or face plate 18 has a central aperture threaded and counterbored to be received onto the left end of a shaft 48, which left end in Fig. 7 is shown in threaded engagement with this plate aperture and is shown to have a flange 49 occupying a counterbore in the latter. Flange 49 is further secured to plate 18 by pins 50. Shaft 48 thus forms part of a trunnion-like structure fixed on face plate 18. The opposite end of shaft 48 is journaled in a bearing bushing 51 lodged in a hole through an enlarged section 20 of handle 14 which hole is counterbored at 52 to provide a shoulder against which a cupped spring washer 53 is pressed at its peripheral edge by the thrust nut 54. This nut is in threaded engagement with the end of the shaft and is adjustably turnable by means of wrench holes 55.

Midway its length, shaft 48 has a stepped section 56 provided with right-handed threads and an adjoining stepped section of slightly smaller diameter 57 provided with left-handed threads at the rear thereof. A clutch drum 58 has an internally threaded hub which screws onto the threaded section 56 of shaft 48 and tightly against the shoulder 59. A lock nut 60 having left-handed threads screws onto the shaft section 57 until it draws up tightly against the hub of clutch drum 58. In this manner loosening of the brake drum on the shaft is dependably prevented because in one direction the clutch drum can not be screwed any more tightly against shoulder 59 while in the other direction it will encounter lock nut 60. If the drum tends to turn the lock nut it will only succeed in drawing the latter that much tighter against itself because of the different hand of the threads on the shaft sections 56 and 57.

The peripheral rim of clutch drum 58 is of dovetail shape in cross section as best shown in Figs. 5 and 7 and radially inside of this peripheral rim there are carried two clamps 61 on opposite sides of the center of rotation, which serve on occasion to force the rim 43 of clutch disc 39 against a planar annular surface on the web of the clutch drum 58 as a means of making this clutch disc and clutch drum fast to each other, or relatively free, as desired. Each clamp piece 61 is rigid with a bolt 62 whose head is fastened thereto by a pin 63. The bolt projects through a hole in the web of brake drum 58 to receive the washer 64 and a tightening nut 65.

Fig. 8 shows a two-piece clamp which constitutes an anchorage shoe capable of grabbing the clutch drum 58. Referring particularly to Fig. 8, the springy piece 66 of this shoe is provided with a dovetail engaging lip 67, and at one end is firmly mounted on a block-like piece 68 of the anchorage shoe by means of bolt 69. A cut-back 85 in the shoe block 68 provides room for the free end of spring piece 66 to be forced toward the block by a tightening and loosening bolt 70 having the radial operating handle 71 to afford finger leverage for the hand of the operator. Block 68 has a corresponding dovetail engaging lip 72 and also threaded holes 73 and 74 to receive bolts 69 and 70 respectively. This block also carries a lug 75 containing a bearing hole 76 for the swivel connector pin 92, best shown in Fig. 3, whose head has threaded engagement with an adjustor screw 84.

Adjustor screw 84 is for providing a finely controllable micrometer setting of the shoe block 68 along the path of movement of the periphery of clutch drum 58. One of the reinforcing ribs 80 of the angle base is provided with a rearwardly extending boss 81 which is bored therein from the rear and receives the cylindrical shank of a hinge stud 82 whose head affords axial thrust bearing for the unthreaded shank of adjustor screw 84. This shank terminates in a thrust flange 87 and has an operating hand knob 88 secured thereto by a tapered pin 89. This shank of hinge stud 82 is free to rotate in boss 81 and is maintained therein by means of its circular groove 90 with which the end of a set screw 91 retainingly engages.

Fig. 5 shows preferred construction of a clamping device for staying the clutch drum 58, and thereby the work holding plate 18, with more perfect fixity in any of its universal rotative positions than is attainable solely through the action of adjusting screw 84 whose associated movable parts require some working clearance, however small. A fillet 93 extends between two of the ribs 24 and affords a seat for a bracket 94 which is fixedly mounted thereon by bolts 94 and shaped to overhang the periphery of brake drum 58. Although bracket 94 has an arcuate lip 96 loosely engaging the dovetail-shaped periphery of clutch drum 58, this alone does not offer any resistance to the turning of the drum which may thereby be free to be adjustably rotated past the lipped bracket 94 while in sliding contact therewith. However, a lipped clamp piece 97 is provided which is capable of being drawn against the opposite or front edge of the dovetail on the periphery of drum 58 by means of the draw bolt 98 whose head is pinned to clamp 97 at 99. Bolt 98 extends through and projects rearward from bracket 94 and receives a thrust washer 100 and has threaded engagement with a nut-like hand-knob 101 which can be turned in either direction thereby to tighten or loosen the clamp piece 97 for arresting or freeing brake drum 58. Thus clamp 66 or 97 united with support base 12, together with drum 58 united with face plate 18, are examples of cooperative means excluding measuring wheel 32 for releasably fastening the face plate directly to the support base.

In Fig. 1 a template 107, representative of any work object or work piece, is shown clamped against the flat upright face of plate 18 by means of slotted straps 109 overhanging the edges of the template and drawn toward the face plate 18 by screws 110 which can engage any of tapped holes 111 in the face plate. 108 represents one straight edge of plate 107 and holes therein are indicated at 112.

While there are many uses to which the fixture of these improvements may be put, such as to hold work firmly in desired angular relations while it is being supported and operated upon by a machine tool, such as milling machine, grinding machine, shaper or the like, its operation will be explained particularly for measuring the edges, as 108, or holes 112 of template 107 or scribing layout lines upon the surface thereof. Work piece 107 is observed to have several other angularly related edges.

Initially the template or work piece 107 will be clamped tightly and fixedly against the vertical face of plate 18 in arbitrary position by means of slotted holding straps 109 and screws 110. At this time the surface plate 18 may or may not be fast to the measuring wheel 32 depending upon the tightness with which nuts 65 are set up on clamp bolts 62. Measuring wheel 32 may first be locked against rotative displacement by means of lock plug 28 which for this purpose will be thrust into positive holding engagement with the rear hollow end of some one of the sine plugs 78. Ordinarily the "zero" indicia 29 and 31 will be in register at this time. With measuring wheel 32 so locked, and nuts 65 loosened, the work holding plate 18 is freed for rotative adjustment that may bring the straight edge 108 of template 107 into true horizontal alignment, if desired, as shown in full lines in Fig. 1. After this is done tightening of nuts 65 will make the face plate 18 fast to the measuring wheel 32. Thus both face plate and measuring wheel are locked stationary. This represents a considerable improvement in speed and accuracy as compared with the former time consuming and troublesome attempts to bring work piece edge 108 into true horizontal position by tapping it back and forth while held with only partial firmness by straps 109.

Lock plug 28 may now be withdrawn from measuring wheel 32 so that the face plate 18 and measuring wheel 32 may be turned in unison any desired number of degrees away from full line position in Fig. 1, as for instance to swing work piece 107 to the position represented by broken lines in Fig. 1. At this stage of operation, the anchoring shoe 67, 68, whose clamp handle 70, 71 has stood loosened in order to permit turning of the clutch drum 58 in unison with face plate 18 may be caused tightly to clutch the dovetail edge of drum 58 by means of said handle and clamp the shoe fixedly to the drum. A final rotary adjustment of plate 18 with micrometer accuracy may now be attained by turning the hand knob 88 of adjusting screw 84 which will push or pull shoe 66, 68 fine amounts to the right or left in Fig. 2. When a satisfactorily accurate positioning of the work piece is thus attained, its position can be maintained positively by tightening hand knob 101. This causes the clamp piece 97 on frame bracket 94 to grab the periphery of clutch drum 58 and hold it positively stationed.

In each of the above mentioned stages of handling work by means of my improved measuring fixture, desired angles may be found or determined with great accuracy by the sine method of measurement which consists in using a conventional height gauge, whose sensing finger 83 is indicated in Figs. 1, 3 and 7 and which stands in well known manner upon shop surface plate 9, to measure the vertical distance from the top of such surface plate (which coincides with the bottom surface of base wall 11) to each of two diametrically opposite sine plugs 83 which are of exactly equal diameter and exactly equally spaced from the center of rotary movement of face plate 18. The difference between these two vertical distances divided by one half the diametral distance between plug centers gives the sine of the angle formed with the horizontal by a diametral line passing through the centers of both sine plugs. Such angle can thereby be known or determined with great accuracy by trigonometric computation in the well understood way.

With particular reference to features of distinction between the present construction and that disclosed in my aforesaid copending application, it has been shown that in the latter construction it was necessary to lock the measuring wheel, or so called "carrier ring," to the frame of the angle support in order to lock the work carrying face plate stationary. Herein, however, the function of locking the work support plate 18 stationary and also the function of imparting micrometer rotary adjustment to the work plate 18 by means of screw 84 is entirely independent of measuring wheel 32. Also the handle 14 is newly made use of herein to afford greatly increased axial length for the effective bearing support of work supporting plate 18.

Spring washer 53 exerts a yieldable axial thrust urging plate 18 toward the rear which thrust is borne by support wall 12 through the medium of the measuring wheel hub flange 35 thus enabling all axial fits between support wall 12 and clutch plate 39 and between lock nut 41 and clutch drum 58 to be loose, I may dish the thin springy web 42 of clutch plate 39 and give this web such resilient bias in an axial direction that when the plate rim 43 is clamped tightly against clutch drum 58, it will cause an axial thrust to be exerted on hub 34 toward the left in Fig. 7 relative to the measuring wheel 32 and its hub 34 tending somewhat to neutralize the thrust of flange 49 against hub 34 caused by spring washer 53 and tending thus to ease the frictional resistance to relative turning between face plate and measuring wheel which this spring washer sets up.

In Figs. 14 to 17, inclusive, a modified form of the construction is shown which dispenses with the necessity of extending any hub or other portion of the modified measuring wheel structure 32' through the modified upright wall 12' of the modified angle base 10'. The parts of this modified fixture are in general designated by the same numerals, primed, as in Figs. 1 to 13, so that attention need only be called to the differing features of construction. It will be understood that parts not specifically mentioned as so differing may be constructed along lines identical with, or closely similar to, those hereinbefore described and shown in fuller detail in Figs. 1 to 13. A laterally projecting boss 114 of the upright support wall 12' carries the lock plug 28 and a construction of slide bearing similar to that shown in Fig. 10.

The angle base 10' is reduced to a smaller area in its upright wall 12' than in the case of base 10 and it may be assumed that the modified work holding face plate 18' and measuring wheel 32' remain of the same overall diametrical sizes as in Figs. 1 to 13. The strengthening ribs 24' are correspondingly shorter, however, and terminate at the bracing side walls 13 which are located considerably inward of the side edges of the modified base wall 11'. An arcuate vernier bracket 112 is secured atop the upright support wall 12' by fastening screws 113 as best shown in Fig. 16 and carries the same index and vernier indicia 29 and 30 for accurately measuring angular displacement that appear in Fig. 6. The diameter of the main bearing bushing 19' is reduced to a size to fit the shaft 48' directly, which shaft is thereby journaled in bushing 19' as well as being journaled also in the enlargement 20 of handle 14' and subjected to axial thrust by a spring washer, all as shown in Figs. 7 and 9.

In Figs. 14 to 18, inclusive, there is cut, all the way around in the outer periphery of face plate 18', an annular groove 115 to accommodate the pressure ends of clamp pieces 61' of which there may be any desired number, four being shown in Fig. 15 equally spaced on the circle. These clamp pieces are rockable on a fulcrum lip 116 at their opposite or outer ends and each has threaded engagement with a draw bolt 117 and is contained within a recess 118 milled into the ring-like rim portion of the modified measuring wheel 32' or 32''. In Fig. 14 the measuring wheel is shown as confined to a ring-like structure or arcuate measuring member 32' which encompasses the face plate 18' and is supported solely thereon while rotatably adjustable as well as fastenable by clamps 61' in relation thereto. Fig. 14 shows further that measuring wheel 32' has an inwardly disposed flange 119 against which the rear surface of plate 18' can be pressed by the clamp pieces 61' for setting up a frictional contact sufficient to fasten the face plate 18 and measuring wheel 32 together so that neither can be turned relative to the other. A thrust washer 64' is placed under the head of each draw bolt 117. The heads of some two diametrically opposite such draw bolts are always accessible to be turned for tightening and loosening clamps 61' at the rear of the measuring wheel 32'. Preferably, diametrically opposite clamps will be so tightened or loosened to avoid off-center strain and distortion of the structure at any point. This modified form of measuring wheel 32' as shown in Fig. 16 may carry a graduated scale band 33 bearing angle measuring indicia similar to 31 and 33 in Fig. 6. Also, in the same manner as in Figs. 1 to 13, measuring wheel 32' carries hollow sine plugs 78 in niches 77 internally engageable at their hollow rear ends by the lock plug 28 for purposes that have heretofore fully been explained.

A collar 120 fills the axial space between face plate 18' and the support 12' and thereby takes the thrust of the spring washer 53 shown in Figs. 7 and 9. As differing from the construction shown in Figs. 1 to 13, on shaft 48' right hand threaded section 56' and the adjoining left hand threaded section 57' are provided at a point nearer to the upright support wall 12' as is permitted by entire elimination of the clutch plate 39 of Figs. 1 to 13. This permits the modified clutch drum 58' to be simplified into the form shown in Fig. 14 and it is locked fixedly in place on shaft 48' by the retaining nut 60' in the same manner as in Fig. 7, it being understood that the dovetail-shaped periphery of this modified clutch drum 58 is grabbed and released by the clutch shoe 66' in the same manner as in Figs. 1 to 13. The purpose and action of micrometer adjusting screw 84 and of the permanent position locking clamp 97 remain the same as in Figs. 1 to 13.

In a still further modified form of construction shown in Fig. 18 the spacer collar 120 is joined to the ring-like rim of further modified measuring wheel 32'' by means of a circularly continuous disc-like web 121 so that collar 120 becomes in effect the hub 120' of this modified form of measuring wheel. In this form of the construction, shaft 48' serves as a supporting journal for the measuring wheel 32'' which, when clamps 61' are loose, is free for rotary movement relative to shaft 48'.

In the operation of the modified construction of fixture shown in Figs. 14 to 18, there is no difference in function from the uses to which the construction shown in Figs. 1 to 13 is put other than that the setting up and loosening of clamp bolts 117 takes the place of setting up and loosening clamp nuts 65. Two of these clamp bolts are always accessible at diametrically opposite points on the measuring wheel 32' or 32'' whatever may be the rotary position of the latter. Axial compactness is increased by the modifications shown in Figs. 14 to 18 permitting the fixture to be made somewhat narrower from front to back than is the case in Figs. 1 to 13. Particularly for testing or measuring light work, my improved fixture is thus made lighter in construction by the reduction in quantity and size of its component parts.

In all forms of the construction, a bearing bushing 122 may be permanently lodged in a counterbore in the front end of the shaft 48 or 48' and the internal diameter of this bushing will preferably be a snug sliding fit for a removable sine plug of exactly the same outside diameter as sine plugs 78 so that such removable sine plug, as indicated by broken lines at 123 in Figs. 7 and 14, can be shoved into this center bushing 122 exactly concentric with the axis about which the sine plugs 78 revolve. Such a center sine plug will be found useful where it is desired to accurately center a circular or symmetrical work piece on the face plate 18'. Also when needed it can be contacted by the sensing finger 83 of a height gauge or the like to help in the accurate determination of angles.

As a substitute in function and purpose for clamp means 61 or 61', the peripheral ring-like rim of measuring wheel 32 or 32' may be provided with one or more radially directed threaded holes (not shown) with which a preferably flush headed set screw (not shown) may have threaded engagement to be turnable by a screw driver or wrench from the outside and whose inner end, which may be flat, cupped or pointed, will releasably bind against the outermost periphery of work holding plate 18 or 18' thereby to lock this measuring wheel and plate against relative rotary movement when the set screw is turned in and releases them for such relative movement when retracted.

In still further modification of the construction shown, the measuring wheel 32' need not be circularly complete but may comprise a mere segmental portion or sector of a complete circular wheel.

It will be understood that the language of the appended claims comprehends and is intended to cover all fair substitutes and equivalents for the particular mechanical parts and arrangements which are herein disclosed merely to illustrate the underlying novel principles of the invention.

I claim:

1. A measuring and layout device or the like for temporarily holding a work object firmly in selective and shiftable exact angular positions, embodying in combination, a support base carrying a stationary index indicium, a rotatable face plate equipped with means to fasten a work object fixedly thereto in arbitrarily inclined position, a wheel associated with said face plate in a manner to rotate relatively thereto and carrying a series of angle measuring indicia adapted to register with said index indicium, bearing means on said support base rotatably supporting said plate, and cooperative means united respectively with said face plate and support base excluding said wheel constructed and arranged releasably to fasten said plate directly to said support base while said wheel remains free for rotary movement relative to said plate and base.

2. A measuring and layout device or the like for temporarily holding a work object firmly in selective and shiftable exact angular positions, embodying in combination, a support base, a rotatable face plate equipped with means to fasten a work object fixedly thereto in arbitrarily inclined position, an angle measuring wheel rotatably associated with said face plate, bearing means on said support base rotatably supporting said plate, cooperative fastening means united respectively with said face plate and said support base excluding said measuring wheel constructed and arranged releasably to fasten said plate directly to said support base while said measuring wheel remains free for rotary movement relative to said plate and base, and separate cooperative means on said face plate and said measuring wheel excluding said support base and said fastening means operative releasably to fasten said plate directly and fixedly to said measuring wheel.

3. A measuring and layout device or the like for temporarily holding a work object firmly in selective and shiftable exact angular positions, embodying in combination, a support base carrying a stationary index indicium, a rotatable face plate equipped with means to fasten a work object fixedly thereto in arbitrarily inclined position, a wheel rotatably associated with said face plate, bearing means rotatably supporting said wheel and face plate constructed and arranged to confine both said plate and wheel to rotary movement relatively to each other as well as in unison about a common axis fixed in relation to said support base, and cooperative means united respectively with said face plate and support base excluding said wheel constructed and arranged releasably to fasten said plate directly to said support base in fixed absolute rotary position relative thereto while said wheel remains free to be rotated relatively to both said plate and base.

4. A measuring and layout device or the like for temporarily holding a work object firmly in selective and shiftable exact angular positions, embodying in combination, a support base, a rotatable face plate equipped with means to fasten a work object fixedly thereto in arbitrarily inclined position, an angle measuring wheel rotatably associated with said face plate, bearing means rotatably supporting said measuring wheel and face plate constructed and arranged to confine both said plate and wheel to rotary movement relatively to each other as well as in unison about a common axis fixed in relation to said support base, and cooperative fastening means united respectively with said face plate and support base excluding said measuring wheel constructed and arranged releasably to fasten said plate directly to said support base in fixed absolute rotary position relative thereto while said measuring wheel remains free to be rotated relative to both said plate and base, and separate cooperative means on said face plate and measuring wheel excluding said support base and said fastening means operative releasably to fasten said plate directly and fixedly to said measuring wheel.

5. A work holding fixture including in combination, a support structure containing a vertical wall bored to afford a stationary bearing hole having a horizontal axis, and a compound work holding and angle measuring structure including a measuring wheel having a hollow cylindrical trunnion journaled in said bore to support said wheel for turning movement relative to said wall about said axis, and a work holding plate flanking said measuring wheel having a trunnion concentrically journaled within said hollow trunnion of the measuring wheel and likewise confined to turning about said axis.

6. A work piece measuring and testing fixture embodying in combination, a base structure presenting an upright wall, a measuring wheel carrying angle measuring elements and having a hollow hub journaled in said wall in a manner to be adjustably rotatable about a fixed axis relative thereto, a face plate with instrumentalities carried thereby to fasten a work piece in arbitrary positions thereon and having a trunnion shaft journaled in said hollow hub of the measuring wheel so that said plate is adjustably rotatable about said axis relative to said measuring wheel and wall, universal fastening means constructed and arranged releasably to restrain said face plate and its trunnion shaft from rotary movement in an unlimited number of rotary positions relative to said wall while freely permitting rotary movement of said measuring wheel relative to said face plate, and additional fastening means constructed and arranged releasably to restrain said measuring wheel from rotary movement relative to said face plate while permitting rotary movement of said face plate relative to said wall, whereby said work piece and face plate may be swung in unison with said measuring wheel relative to said wall to selective extents measurable by the degree of rotary movement of said measuring wheel relative to said wall.

7. A work piece measuring and testing fixture embodying in combination, a base structure presenting an upright wall, an angle measuring wheel supported for rotary movement about a given axis relative to said wall, a face plate having instrumentalities to fasten a work piece in arbitrary positions thereon and supported in a manner to be adjustably rotatable about said axis relative to said wheel and relative to said wall, universal fastening means constructed and arranged releasably to stay said face plate against rotary movement in an unlimited number of positions relative to said wall while permitting rotary movement of said measuring wheel relative to said face plate so that the measuring wheel may be swung to any desired orienting position independently of said face plate after the latter is stayed by said universal fastening means, and additional fastening means constructed and arranged releasably to restrain said face plate from rotary movement relative to said measuring wheel while permitting rotary movements of said plate and wheel in unison relative to said wall so that the work piece may be swung in unison with said measuring wheel relative to said wall to selective extents measurable by the degree of rotary movement of said measuring wheel away from its said orienting position.

8. In a work tilting and holding fixture, a support base, a rotatable work carrying structure rotatably mounted on said base including a clutch drum, a drum clutching shoe impellingly engageable with a peripheral portion of said drum, an adjustor screw mounted on said base in a manner both to be rotated upon its own axis and also to be tilted bodily relative to said base and having threaded engagement with said shoe in a manner to cause the latter to impel said drum through a limited arc of rotative adjustment.

9. In an angle measuring and layout fixture, the combination with a support wall containing a round orientation hole, of a work carrying structure mounted for rotary movement about an axis normal to said wall in a manner to traverse a face of the wall in the neighborhood of said hole, at least one bushing embedded in said structure having one end opening through said structure toward said wall, an elongated plug having a cylindrical shank of diameter to enter and slidingly fit within said orientation hole and within the open end of said bushing, said plug having a shank section of reduced diameter, and a split bushing surrounding said shank section of the plug removably but tightly lodged in said orientation hole and shaped to restrain said plug from being removed from said orientation hole.

10. A work holding fixture, including in combination, a fixture base having an upright support wall carrying an index mark, a bearing supported by said wall, a rotatable plate having a vertical front face adapted to hold work fixedly thereon, a trunnion-like structure fixed on and projecting rearward from said plate journaled in said bearing to permit turning of said plate about a horizontal axis, an arcuate measuring member bordering on said plate at the front of said support wall swingable about said axis and carrying circumferentially spaced angle-denoting indicia, means to fasten said plate against rotary movement relative to said wall, and means to fasten said measuring member and plate against rotary movement relative to each other.

11. A measuring and layout device as defined in claim 5, together with a clutch member carried by the said plate trunnion at the rear of said support wall, and means engaging said clutch member carried by said wall and constructed and arranged to be manipulated for arresting or releasing said plate at will.

12. A measuring and layout device as defined in claim 5, together with a clutch member carried by the said plate trunnion at the rear of said support wall, clamp means stationed on said wall engaging said clutch member and constructed and arranged to be manipulated for arresting or releasing said clutch member at will, and additional clamp means carried by said wall in arcutely shiftable relation to the latter constructed and arranged to engage and cling to said clutch member in a manner to shift the latter rotatively when itself shifted in relation to said wall.

13. In a work holding fixture, the combination with a rotatable work holding structure of, an angle base containing an upright wall having a horizontal bore affording rotary bearing support for said structure, a stiff bail-like handle rigid with said angle base spanning the angle embraced by said base and having a portion axially aligned with said bore, and a bearing in said handle portion in which also said rotatable work holding structure is journaled.

14. In a work holding fixture, the combination with a rotatable work holding structure including a projecting trunnion of, an angle base containing an upright wall having a horizontal bore in which said trunnion is journaled, a stiff bail-like handle rigid with said angle base bridging the angle embraced by said base and having a portion axially aligned with said bore, a bearing in said handle portion in which also said trunnion is journaled, a clutch drum fixed on said trunnion between said wall and said handle portion, and means carried by said angle base to clutch and stay said drum against rotation.

15. In a work holding fixture, the combination with a rotatable work holding plate having a projecting trunnion of, an angle base containing an upright wall at the rear of said plate having a bore in which said trunnion is journaled, a stiff bail-like handle rigid with said angle base spanning the angle embraced by said base and having a portion axially aligned with said bore, a bearing in said handle portion in which also said trunnion is journaled, a graduated angle measuring wheel in front of said wall rotatively associated with said work holding plate, a hollow trunnion on said measuring wheel sleeved about said plate trunnion within said bore and extending to the rear of said wall, a clutch drum fixed on said plate trunnion at the rear of said wall, a clutch plate fixed on said wheel trunnion between said clutch drum and said wall, and means releasably to fasten said clutch drum and said clutch plate together in universal rotary positions.

16. A work holding fixture as defined in claim 10, in which the said upright support wall occupies a sufficiently small overall area to leave an outer margin of the said arcuate measuring member exposed and clear of the outer boundary of said support wall, together with fastening means carried by the said exposed outer margin of said arcuate measuring member in a manner to be accessible for manipulation at the rear thereof, said fastening means being cooperatively related to said member and plate in a manner selectively to fasten them together against rotary movement relative to each other.

17. A work holding fixture as defined in claim 10, in which the said arcuate measuring member comprises a portion of a circularly complete ring-like structure of larger overall area than the said upright support wall thereby to expose an annular margin of said structure toward the rear and clear of said support wall, together with fastening means carried by said margin of said ring-like structure on diametrically opposite sides of the said axis and accessible from the rear for manipulation thereat to make said ring-like structure fast to the said face plate.

18. A work holding fixture as defined in claim 10, in which the said arcuate measuring member comprises a portion of a circularly complete wheel rotatably sleeved on the said trunnion-like structure of the said rotatable plate between the latter and the said support wall, together with fastening means carried by said wheel in a manner to be accessible for manipulation and cooperatively related to said member and plate in a manner releasably to fasten them together against relative rotary movement.

19. A work holding fixture including in combination, a support structure containing a vertical wall bored to afford a stationary bearing hole having a horizontal axis, and a compound work holding and angle measuring structure including a measuring wheel having a cylindrical hollow trunnion journaled in said bore to turn about said axis, and a work holding plate flanking said measuring wheel at the same side of said wall as said measuring wheel having a trunnion concentrically journaled within said hollow trunnion of the measuring wheel and thereby confined to turning about said axis.

20. A measuring and layout device or the like for temporarily and firmly holding a work object in variable positions, embodying in combination, a support base having a planar bottom on which said device may stably rest, a rotatable face plate structure equipped to receive and fixedly hold a work object in arbitrary positions thereon, a measuring wheel rotatably supported by said face plate structure, bearing means rotatably supporting said plate structure and measuring wheel constructed and arranged to confine the same to rotary movement both relatively and in unison about a common axis angularly displaced from perpendicular relation to said bottom of said base, and cooperative means united respectively with said measuring wheel and plate structure constructed and arranged releasably to fasten said measuring wheel in fixed rotative relation to said plate structure.

21. A measuring and layout device as defined in claim 20, in which the said measuring wheel and the said support base are provided respectively with cooperative graduation marks and an index mark for measuring relative angular displacement therebetween, together with sine plugs projecting in fixed relation to said carrier.

22. A work piece measuring and testing fixture embodying in combination, a base structure, an angle measuring wheel supported for rotary movement about a given axis relative to said structure, a work supporting plate having instrumentalities for fastening a work piece in arbitrary positions thereon and supported in a manner to be adjustably rotatable about said axis relative to said wheel and relative to said base structure, cooperative fastening means united respectively with said plate and measuring wheel constructed and arranged releasably to stay said plate against rotary movement in selective rotary positions relative to said base structure while permitting rotary movement of said measuring wheel relative to said plate so that the measuring wheel may be swung to any desired orienting position independently of said plate after the latter is stayed by said universal fastening means, and additional cooperative fastening means united respectively with said plate and base structure constructed and arranged releasably to restrain said plate from rotary movement relative to said measuring wheel while permitting rotary movements of said plate and wheel in unison relative to said base structure so that the work piece may be swung in unison with said measuring wheel relative to said base structure to selective extents measurable by the degree of rotary movement of said measuring wheel away from its said orienting position.

OTTO E. SORENSEN.